US012627760B2

(12) United States Patent
Koutikas et al.

(10) Patent No.: US 12,627,760 B2
(45) Date of Patent: May 12, 2026

(54) SEMI-GLOBAL MUTING

(71) Applicant: IPC Systems, Inc., Jersey City, NJ (US)

(72) Inventors: Elias Koutikas, Oxford, CT (US); Rajeshkumar Govindaraj, Milford, CT (US)

(73) Assignee: IPC Systems, Inc., New York, NY (US)

( * ) Notice: Subject to any disclaimer, the term of this patent is extended or adjusted under 35 U.S.C. 154(b) by 142 days.

(21) Appl. No.: 18/431,172

(22) Filed: Feb. 2, 2024

(65) Prior Publication Data

US 2025/0254241 A1 Aug. 7, 2025

(51) Int. Cl.
*H04M 3/56* (2006.01)
*G06F 3/16* (2006.01)

(52) U.S. Cl.
CPC ............ *H04M 3/564* (2013.01); *G06F 3/165* (2013.01); *H04M 3/568* (2013.01); *H04M 2203/5045* (2013.01)

(58) Field of Classification Search
None
See application file for complete search history.

(56) References Cited

U.S. PATENT DOCUMENTS

| | | |
|---|---|---|
| 7,209,763 B2 | 4/2007 | Martin et al. |
| 7,317,791 B2 | 1/2008 | Carlson |
| 7,904,056 B2 | 3/2011 | Speranza |

| | | | |
|---|---|---|---|
| 7,983,199 B1 | 7/2011 | Nguyen et al. | |
| 8,126,129 B1 * | 2/2012 | McGuire | H04M 3/568 |
| | | | 379/202.01 |
| 8,767,942 B2 | 7/2014 | Elliott | |
| 2005/0076128 A1 | 4/2005 | Tsai | |
| 2005/0094792 A1 | 5/2005 | Berthoud et al. | |
| 2007/0291918 A1 * | 12/2007 | Diethorn | H04M 3/568 |
| | | | 379/202.01 |
| 2009/0098898 A1 | 4/2009 | Patterson | |
| 2011/0085655 A1 * | 4/2011 | Elliott | H04M 3/56 |
| | | | 370/352 |

(Continued)

FOREIGN PATENT DOCUMENTS

| | | |
|---|---|---|
| EP | 3257236 B1 | 4/2022 |
| EP | 4192031 | 6/2023 |
| WO | 2023/021390 | 2/2023 |

OTHER PUBLICATIONS

PCT International Search Report and Written Opinion in Application PCT/US2025/013991, mailed Apr. 23, 2025, 10 pages.

*Primary Examiner* — Antim G Shah
(74) *Attorney, Agent, or Firm* — Merchant & Gould P.C.

(57) ABSTRACT

The present disclosure is directed towards a semi-global mute system and method. In one example, a method for muting communication devices includes receiving a message indicating the semi-global mute switch has been activated. The method further includes upon receiving the message: preventing a co-located communication device from receiving the audio signals transmitted from the first audio communication device, permitting the first audio communication device to transmit signals to the remote communication device, and permitting the first audio communication device and the co-located communication device to receive audio signals transmitted from the remote communication device.

14 Claims, 7 Drawing Sheets

(56) References Cited

U.S. PATENT DOCUMENTS

| 2015/0195411 A1 | 7/2015 | Krack et al. |
| 2018/0048768 A1 | 2/2018 | Spittle et al. |
| 2021/0195325 A1* | 6/2021 | Edry .................... H04M 3/002 |
| 2022/0398064 A1 | 12/2022 | Desai et al. |
| 2022/0400023 A1 | 12/2022 | Agrawal et al. |

* cited by examiner

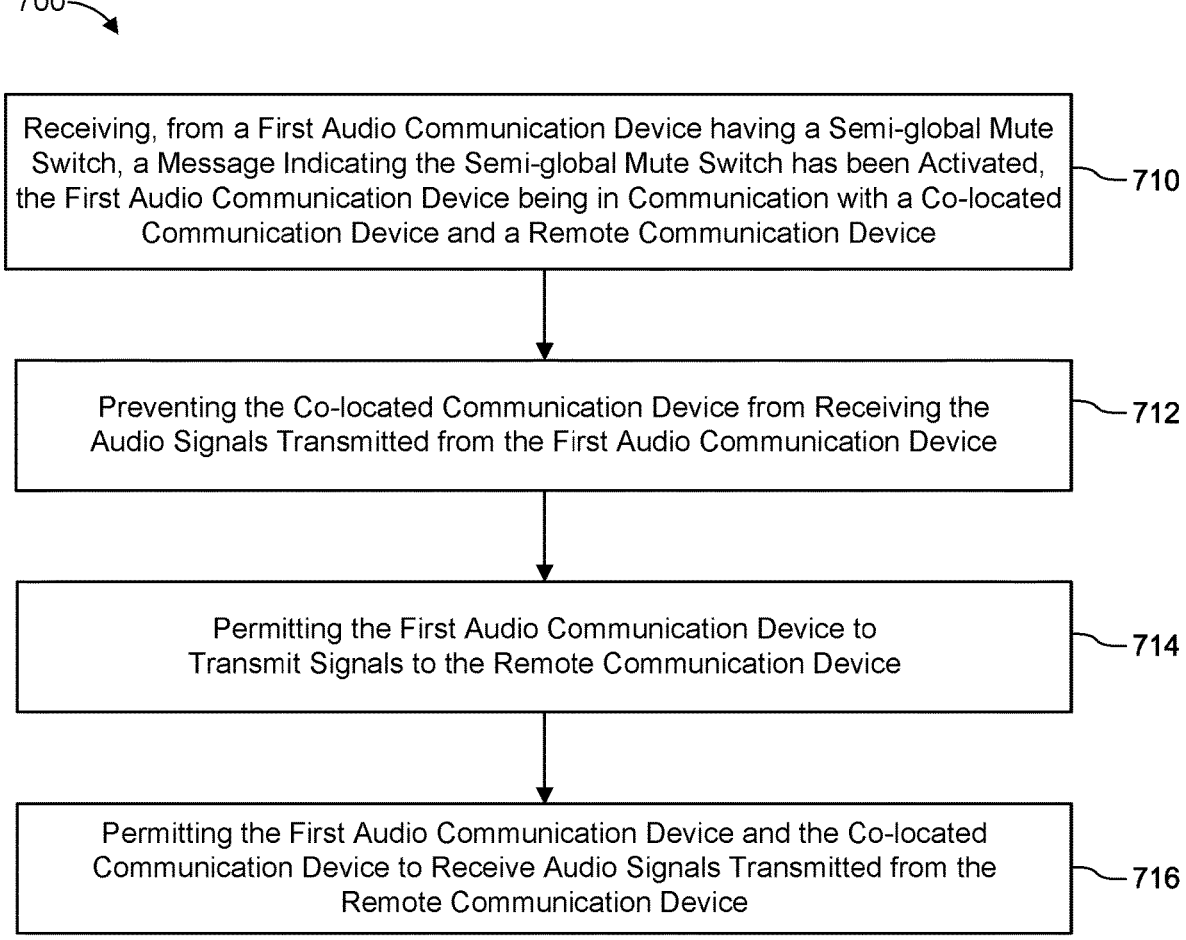

700

Receiving, from a First Audio Communication Device having a Semi-global Mute Switch, a Message Indicating the Semi-global Mute Switch has been Activated, the First Audio Communication Device being in Communication with a Co-located Communication Device and a Remote Communication Device ⎯710

Preventing the Co-located Communication Device from Receiving the Audio Signals Transmitted from the First Audio Communication Device ⎯712

Permitting the First Audio Communication Device to Transmit Signals to the Remote Communication Device ⎯714

Permitting the First Audio Communication Device and the Co-located Communication Device to Receive Audio Signals Transmitted from the Remote Communication Device ⎯716

FIG. 7

SEMI-GLOBAL MUTING

BACKGROUND

A trading communications system represents a special-ized switching infrastructure tailored to grant a relatively small number of users access to a vast array of external lines. This system offers an array of advanced communication functionalities, including hoot-n-holler, push-to-talk, inter-com, video capabilities, and large-scale conferencing. A turret device, also referred to simply as a "turret," serves as the component allowing a user to manage multiple dedicated and active communication lines, facilitating simultaneous communications with multiple parties. Turret devices may incorporate dual handsets, multichannel speaker modules, and support several communication lines.

A trading turret device can be implemented either in dedicated hardware, termed a "hard" turret, or in software, known as a "soft" turret. A hard turret typically manifests as a phone-like desktop device equipped with multiple hand-sets, speakers, and buttons. Conversely, a soft turret exists as a software application that operates on a trader's desktop personal computer (PC) or mobile devices like smartphones. Control of a soft-turret application occurs through the native control interface provided by the computer, including touch screens, styluses, click wheels, or mouse and keyboard inputs. In addition to displaying a graphical representation of the turret on the PC screen, the soft-turret application may also offer voice and presence features. A soft turret can also be implemented by a combination of a PC or mobile device and connected hardware components such as one or more handsets, speakers, and buttons, providing flexibility in its configuration and usage.

Trading turret devices include many different audio input and output devices. For example, a trading turret may include a handset, speakers, and/or a headset for either capturing audio or outputting audio received from a separate device. Each of these devices are configured to connect to a communication system or turret to enable voice communi-cation with a remote device.

Two basic types of turret calls are known as "handset calls" and "speaker calls". Handset calls behave similarly to standard telephone calls and can be used to speak to some-one else or a group of people in a conference call. An audio data stream comprises both a talk path (also referred to as a transmit channel), which corresponds to an input audio data stream, and a receive path (also referred to as a receive channel), which corresponds to an output audio data stream. This arrangement essentially involves the transmission and reception of audio data, with the transmit channel serving as the pathway for input data and the receive channel handling the output data stream. Speaker calls in a communication device have the receive channel communicatively coupled to a speaker. Speaker Calls involve a push-to-talk (PTT) button which communicatively couples a microphone in a commu-nication device to the transmit channel of a speaker call. In the case where a communication device is connected to multiple speaker calls, there are multiple push-to-talk but-tons that can be selected at the same time to connect the microphone of the communication device to the transmit channels of multiple speaker calls.

Within trading environments, there are multiple users utilizing communication devices in close physical proximity to each other. These users are referred to herein as internal users because they operate within the same organizational or institutional context, sharing a spatial proximity facilitated by the use of turret devices. The communication devices used by internal users are referred to herein as internal communication devices. An external user is someone who engages in communication with internal users but is situated in a different physical location, preventing direct audible communication without the use of the specified communi-cation devices. The communication devices used by external users are referred to herein as remote communication devices. Internal users of communication devices and sys-tems communicate with external users (e.g., colleagues, clients, reporters, etc.) of other communication devices that are located offsite and physically remote from the trading environment such that the internal users and the one or more external users cannot hear one another speaking without the communications devices.

A problem arises if, for example, the internal users want to be able to hear the one or more external users on their speaker device(s) while one of the internal users is talking to the one or more external users, but the internal users do not want their speaker device(s) to broadcast the voice of the talking internal user. For example, one of the internal users activates a talk button on their communications device allowing them to talk to the external user while, at the same time, the external user is talking back to the internal user as part of a conversation between the talking internal user and the external user. It can be irritating and distracting for the internal users to hear both sides of the conversation between the internal user and the external user through their speaker device(s), as this means that the internal users are effectively hearing the internal user talk twice and out of phase-first naturally and then via the speaker device(s).

The technical reason for this problem is related to audio feedback and the handling of simultaneous incoming and outgoing audio streams in communication systems. When an internal user activates the talk button to communicate with an external user, the audio system must manage both the incoming audio from the external user and the outgoing audio from the internal user. If the system allows the internal user's own voice to be played back through their speaker device(s) while they are talking, it leads to a phenomenon known as "sidetone."

Sidetone occurs when the user hears their own voice in real-time during a conversation. In this specific situation, sidetone can be perceived as irritating and distracting because the internal user hears their own speech both naturally and through the speaker device(s), causing a phase mismatch and a potential echo effect. The challenge is to design the audio processing system to provide a seamless communication experience, allowing the internal user to hear external users without introducing unwanted feedback from their own voice during active transmission.

It is with respect to these and other general considerations that embodiments have been described.

SUMMARY

In accordance with the present disclosure, the above and other issues are addressed by the following:

In one example, a method for muting communication devices includes receiving, from a first audio communica-tion device having a semi-global mute switch, a message indicating the semi-global mute switch has been activated, the first audio communication device being in communica-tion with a co-located communication device and a remote communication device. The method further includes upon receiving the message: preventing the co-located communi-cation device from receiving the audio signals transmitted from the first audio communication device, permitting the first audio communication device to transmit signals to the remote communication device, and permitting the first audio communication device and the co-located communication device to receive audio signals transmitted from the remote communication device.

In other examples, the co-located communication device and the first audio communication device are in acoustic proximity. In other examples, the method further includes transmitting a second audio signal received from the remote communication device to the first audio communication device and the co-located communication device. In other examples, the first audio communication device and the co-located communication device are in a media management zone. In other examples, the remote communication device is external to the media management zone, and the remote communication device is in communication with the media management zone using a network bridge. In other examples, the audio signals are received through a first talk path corresponding to the first audio communication device, and the audio signals are provided to the at remote communication device through a first receive path corresponding to the co-located communication device, and wherein the first receive path connects to the first talk path through the network bridge. In other examples, the message indicating the semi-global mute switch has been activated further indicates the co-located communication device outputs received audio through one or more speakers.

In a second example, a system for selectively muting communication devices includes a first audio communication device including a semi-global mute switch. The system further includes a co-located communication device. The co-located communication device is located within the same audible area as the first audio communication device. The system further includes a remote communication device and one or more media managers. The one or more media managers includes one or more processors, and one or more memory devices coupled to the one or more processors and storing data instructions. When executed by the one or more processors, the one or more memory devices cause the one or more processors to receive, from the first audio communication device, a message indicating the semi-global mute switch has been activated, the first audio communication device being in communication with the co-located communication device and the remote communication device. Upon the reception of the message, the one or more processors are further caused to prevent the co-located communication device from receiving the audio signals transmitted from the first audio communication device, permit the first audio communication device to transmit signals to the remote communication device, and permit the first audio communication device and the co-located communication device to receive audio signals transmitted from the remote communication device.

In other examples, the co-located communication device and the first audio communication device are in acoustic proximity. In other examples, the one or more processors is further caused to transmit a second audio signal received from the remote communication device to the first audio communication device and the co-located communication device. In other examples, the first audio communication device and the co-located communication device are in a media management zone. In other examples, the remote communication device is external to the media management zone, and the remote communication device is in communication with the media management zone using a network bridge. In other examples, the audio signals are received through a first talk path corresponding to the first audio communication device, and the audio signals are provided to the at remote communication device through a first receive path corresponding to the co-located communication device, and wherein the first receive path connects to the first talk path through the network bridge. In other examples, the message indicating the semi-global mute switch has been activated further indicates the co-located communication device outputs received audio through one or more speakers.

In a third example, a non-transitory computer-readable medium has stored thereon one or more sequences of instructions for causing one or more processors to perform receiving, from a first audio communication device having a semi-global mute switch, a message indicating the semi-global mute switch has been activated, the first audio communication device being in communication with a co-located communication device and a remote communication device. Upon receiving the message, the instructions further cause the one or more processors to perform preventing the co-located communication device from receiving the audio signals transmitted from the first audio communication device, permitting the first audio communication device to transmit signals to the remote communication device, and permitting the first audio communication device and the co-located communication device to receive audio signals transmitted from the remote communication device.

In some examples, the co-located communication device and the first audio communication device are in acoustic proximity. In some examples, the instructions further cause the one or more processors to perform transmitting a second audio signal received from the remote communication device to the first audio communication device and the co-located communication device. In some examples, the first audio communication device and the co-located communication device are in a media management zone. In some examples, the remote communication device is external to the media management zone, and the remote communication device is in communication with the media management zone using a network bridge. In some examples, the audio signals are received through a first talk path corresponding to the first audio communication device, and the audio signals are provided to the at remote communication device through a first receive path corresponding to the co-located communication device, and wherein the first receive path connects to the first talk path through the network bridge.

BRIEF DESCRIPTION OF THE DRAWINGS

Non-limiting and non-exhaustive examples are described with reference to the following figures.

FIG. 7 illustrates an example method for enabling the semi-global mute feature shown in FIG. 1.

DETAILED DESCRIPTION

Figure 1:
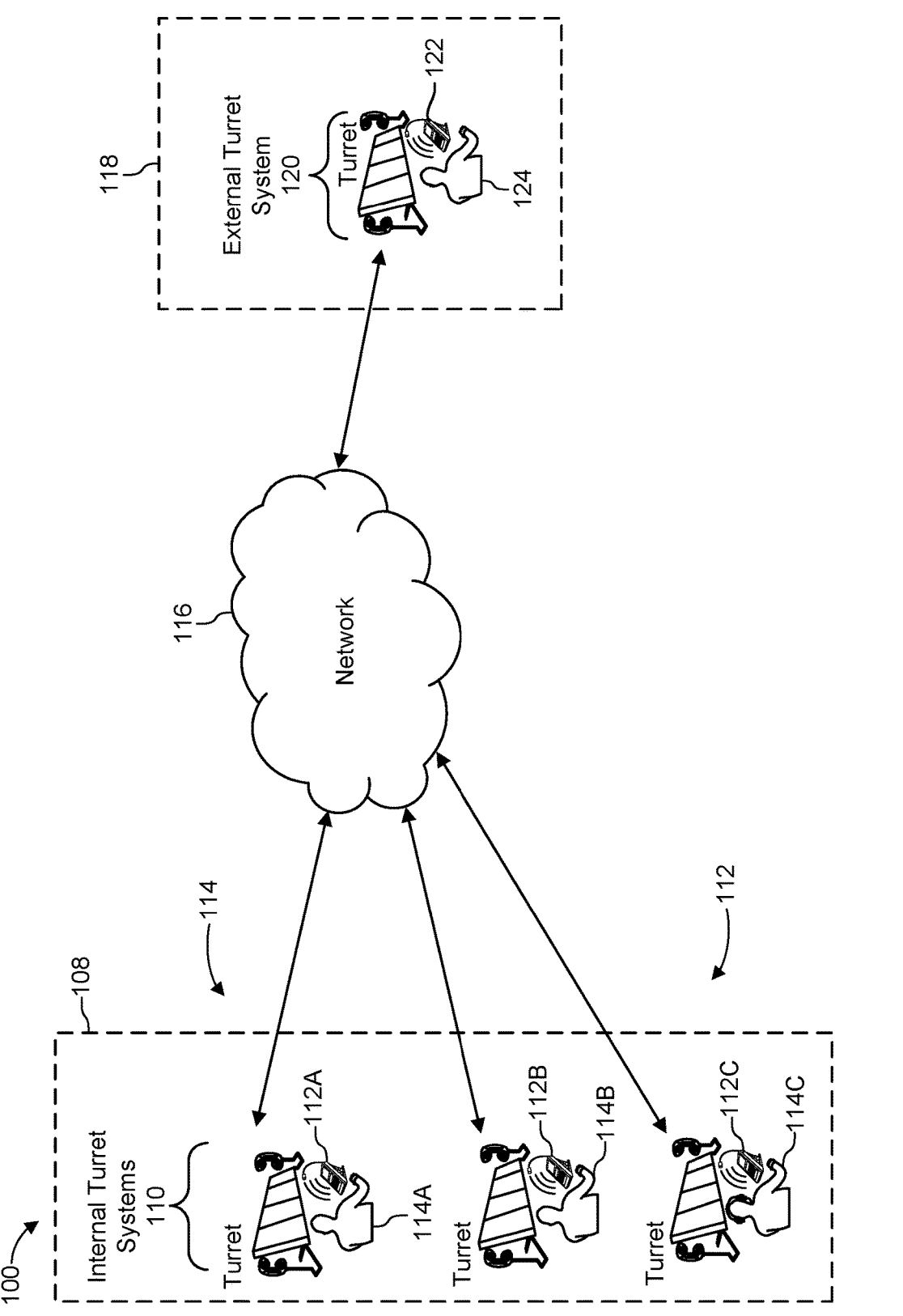
FIG. 1 illustrates an example trading environment for utilizing a semi-global mute system.

This description is not intended to limit the application of the example embodiments presented herein. In fact, after reading the following description, it will be apparent to one skilled in the relevant art(s) how to implement the following example embodiments in alternative embodiments. In addition, not all of the components described herein are required to practice the disclosed systems, devices or methods, and variations in the arrangement and type of the components may be made without departing from the spirit or scope of the disclosure. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

In the several drawings, like numbers refer to like components.

I. Definitions

Some terms are defined below for easy reference. However, it should be understood that the defined terms are not rigidly restricted to their definitions. A term may be further defined by its use in other sections of this description.

"Device" as used herein, generally refers to software, hardware or a combination thereof. A device may sometimes be referred to as an apparatus. Examples of a device include without limitation a laptop computer, a desktop computer, a hard turret, a soft turret, a headset, a handset, any hardware or software capable of converting an utterance into an audio signal, any hardware or software capable of transmitting or receiving an audio signal, any hardware or software capable of converting an audio signal into sound, database, a server, a display, a computer mouse, a hard disk.

"Network" as used herein, generally refers to a connection between any two or more devices, which permits the transmission of data. A network may be any combination of networks, including without limitation the Internet, a network of networks, a local area network (e.g., home network, intranet), a wide area network, a wireless network, and a cellular network.

"Private line" as used herein, generally refers to a dedicated communication channel or circuit that is exclusively used by specific parties for transmitting data, voice, or other forms of communication. In the context of telecommunications or networking, a private line is a dedicated connection that is not shared with other users or the public. It offers a secure and direct point-to-point link between two locations, ensuring privacy, reliability, and often faster transmission speeds compared to shared or public communication lines.

"Software" and "application" as used herein, generally refer to a computer program that is written in a programming language that may be used by one of ordinary skill in the art. The programming language chosen should be compatible with the computer by which the software application is to be executed and, in particular, with the operating system of that computer. Non-limiting examples of suitable programming languages include without limitation C, C++, and Java. Further, the functions of some embodiments, when described as a series of steps for a method, could be implemented as a series of software instructions for operating by one or more processors, such that the embodiments could be implemented as software, hardware, or a combination thereof. Non-transitory computer-readable media are discussed in more detail in a separate section below.

"Speaker", "speakerphone", "conference speaker" or "intercom", as used herein, generally refers to a telecommunications device that allows for hands-free communication during phone calls or conferences. It typically incorporates a loudspeaker that enables multiple individuals to participate in a conversation without physically holding the phone to their ear or using a headphone. Typically, a speakerphone has a microphone built into the device, allowing users to speak while being heard by the other party or multiple participants.

"System" as used herein, generally refers to a device or multiple coupled devices. A device is defined above.

"Co-located", as used herein, generally means situated or placed in close physical proximity, typically within the same general location or area. As used herein two devices that are co-located are positioned nearby or in the same vicinity, potentially sharing the same physical space or being located in immediate proximity to one another.

II. Overview

In some communication systems a local mute feature or a global mute feature of a first communication device can be activated. A local mute feature does not mute internal communication devices when the first communication device is receiving audio and transmitting that audio to a remote communication device. Accordingly, the internal communication devices output the audio even though the internal communication devices are co-located with the first communication device. Even though the local mute prevents the first device from outputting its own received audio, nearby internal communication devices still output the first communication device's audio. This output results in a similar effect of sidetone as if the first communication device had output its own received audio. A global mute feature mutes not only the first communication device as the first communication device transmits received audio to a remote communication device, but also mutes the remote communication device from transmitting audio to the internal communication devices. As a result, internal communication devices do not output audio from the remote communication device as long as the first remote communication device has the global mute function enabled.

The present technology relates to a semi-global mute system that provides functionality different from both the local mute and the global mute. The semi-global mute feature can be activated on a communications device, such as a hard turret or a soft turret, that includes a speaker for receiving voice communications transmitted from other communications devices over a network. The semi-global mute feature, when activated, prevents reception of an audio signal transmitted from a first communications device to a co-located communication device. However, the semi-global mute system allows reception of an audio signal from a remote communications device to both the first communication device and the co-located communication device while semi-global mute is activated.

In an example implementation, a media manager associated with a media management zone (e.g., a trading desk including one or more communication devices) is set up with a mixer that, when semi-global mute is activated, provides a series of unidirectional communications pathways between internal communications devices and remote communications devices to provide the foregoing functionality. The media manager oversees media zones and controls the respective bridges and ports. Further, it connects talk paths and receive paths that are used for audio flow between devices, bridges, ports, and a trunk. The talk paths provide a communication path for transmitting audio from a connected device or bridge. Receive paths provide a communication path for a device to receive audio from a connected device or bridge.

The example embodiments are described herein in terms of example network communication messaging protocols (e.g., Session Initiation Protocol (SIP), Voice over Internet Protocol (VOIP), the Transport Layer Security (TLS) cryptographic protocol, Session Description Protocol (SDP), Real-Time Transport Protocol (RTP)). This description is not intended to limit the application of the example embodiments presented herein. In fact, after reading the following description, it will be apparent to one skilled in the relevant art(s) how to implement the following example embodiments in alternative embodiments (e.g., involving other communication messaging protocols using within private and public communications systems).

III. Environment

FIG. 1 illustrates an example trading environment for utilizing a semi-global mute system. In the shown embodiment, semi-global mute system 100 includes a co-located area 108. The co-located area 108 includes internal turret systems 110. Each turret of the internal turret systems 110 includes a communication device 112 (collectively referred to as "communication devices 112", which includes communication device 112A, 112B, and 112C; and "communication device 112" refers to any or all of the individual communication devices, interchangeably). A first user of users 114 (users 114 includes user 114A, 114B, and 114C; and "user 114" refers to any or all of the shown individual users, interchangeably) may utilize one of the communication devices 112 to communicate with external users through network 116. A co-located area 118 includes external turret system 120, which includes remote communication device 122 for user 124.

Here, the co-located area 108 includes the internal turret systems 110. Each of the shown internal turret systems 110 are within acoustic proximity of one another in this embodiment. In some embodiments, co-located area 108 includes additional internal turret systems that are or are not in acoustic proximity. Acoustic proximity is defined as the communication devices being within a range that audio can be heard or detected from each device. In some embodiments, users 114 may be traders using the internal turret systems 110 to place trades or communicate with other traders, brokers, etc. In some embodiment, communication device 112A emits audio from connected speakers. Thus, any received communication from a remote communication device is outputted from the communication device 112A. Consequently, the user 114A can hear the audio from the remote device 112A. In some embodiments, communication device 112C does not emit audio from its speakers because a connected headset that receives audio input (e.g., from user 114C) is connected (e.g., by user 114C). The headset outputs any audio received from network 116 as opposed to speakers. In other embodiments, a handset is configured to output received audio as opposed to speakers of the communication device 112C outputting received audio.

Further, network 116 may connect to additional communication devices, servers, or other devices not shown here. For example, a third-party server may collect data, such as login information or system data, regarding either the internal turret systems 110 or the external turret system 120 and any associated devices. In some embodiments, a media manager is connected to network 116 and manages communication from internal turret systems 110 including talk paths and receive paths. Co-located area 118 includes external turret system 120, which is a trading communication system. In some embodiments, co-located area 118 includes other communication devices such as a conventional telephone (e.g., Private Branch Exchange or PBX) or a Voice Over Internet Protocol (VOIP) system used to communicate with a remote user, such as a reporter or other entity not involved in trading.

In some embodiments, both the first co-located device 112A and the second co-located device 112B enable the semi-global mute setting or switch. Each of the co-located devices transmit detected audio to the remote communication device 122 and receive transmitted audio from the remote communication device 122. However, the communication device 112A's transmitted audio is not outputted at the communication device 112B, and the communication device 112B's transmitted audio is not outputted at the communication device 112A. Accordingly, each co-located communication device simultaneously communicates with the remote communication device 122 without outputting/playing the other co-located communication device's audio in this embodiment.

Figure 2:
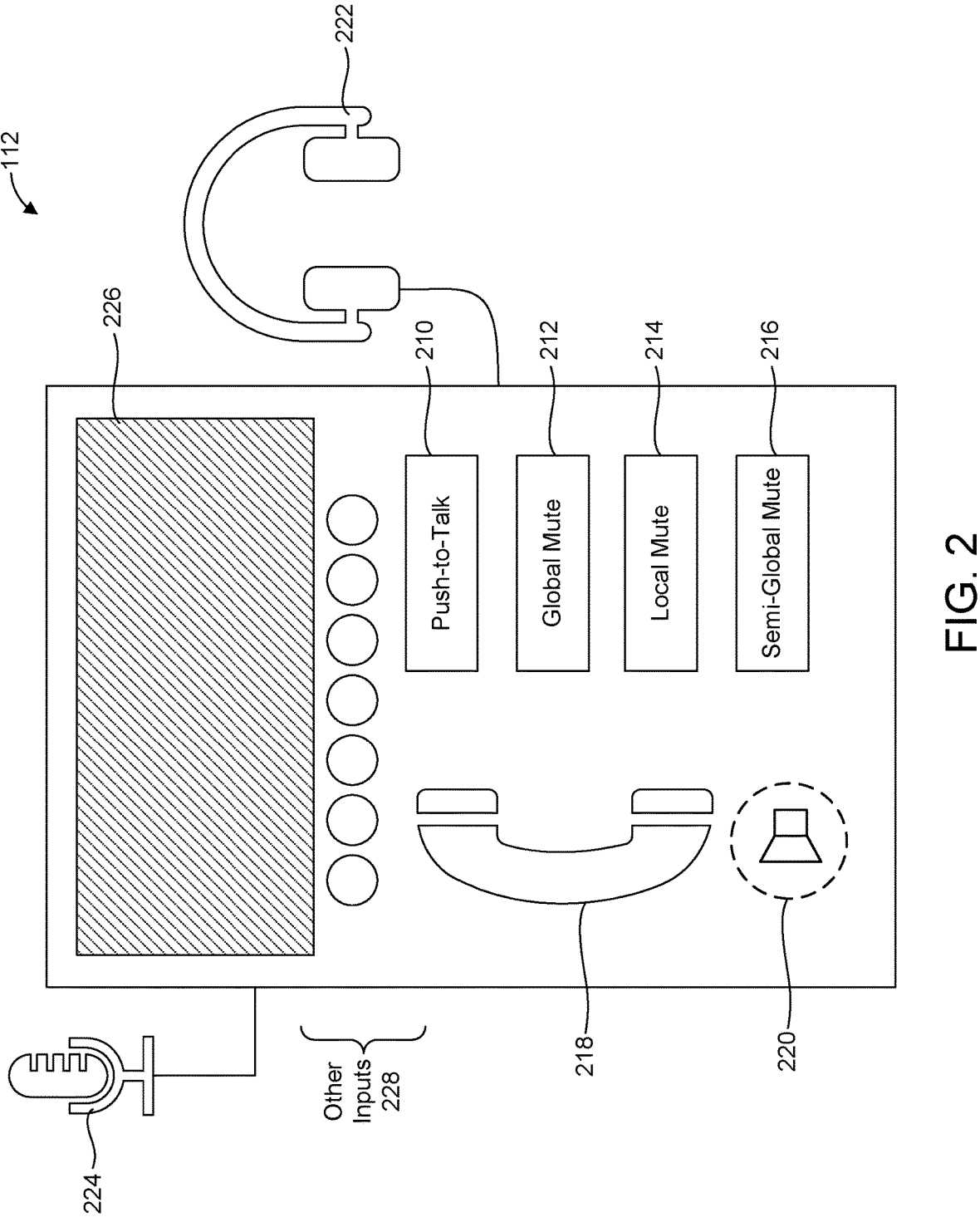
FIG. 2 illustrates an example communication device used in the environment of FIG. 1.

FIG. 2 illustrates an example communication device used in the environment of FIG. 1. In the shown embodiment, communication device 112 includes push-to-talk input 210 to enable a microphone to transmit detected audio to other communication devices. Further, communication device 112 includes a plurality of mute options, including global mute 212, local mute 214, and semi-global mute 216. The communication device 112 also includes a variety of input and output features, such as handset 218, speaker input 220, headset 222, microphone 224, display 226, and other inputs 228.

As seen in this embodiment, communication device 112 includes different options to input audio (e.g., by a user) and output received audio (e.g., so that it can be heard by a user). In some embodiments, the communication device 112 only includes one of the shown input or output devices. As an example, the communication device 112 may only include a handset 218 and not include the headset 222 or the microphone 224. The communication device 112 may include any combination of the input and output devices and may also include equivalents thereof.

Figure 3:
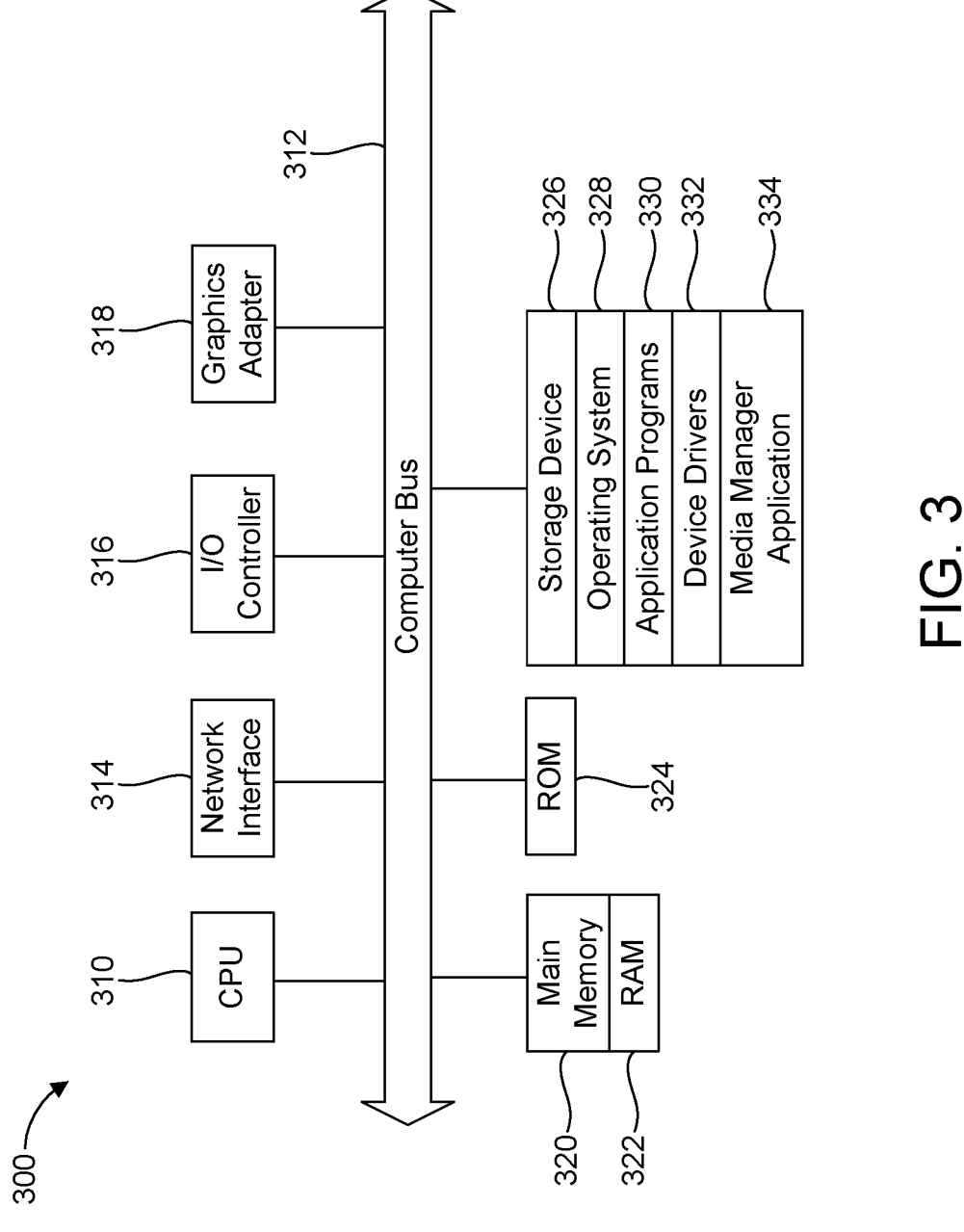
FIG. 3 is a block diagram illustrating an example of the internal architecture of a computing device that can be used as one or more of the entities discussed in FIG. 1.

FIG. 3 is a block diagram illustrating an example of the internal architecture of a computing device that can be used as one or more of the entities discussed in FIG. 1. As shown in FIG. 3, computing device 300 includes a central processing unit (CPU) 310 which interfaces with computer bus 312. Also interfacing with computer bus 312 are storage device 326 (e.g., a hard disk, flash memory, or the like), network interface 314, main memory 320 that includes random access memory (RAM) 322 for use as a main run-time transient memory, read only memory (ROM) 324, graphics adapter 318 for interfacing with a display, and I/O controller 316 for interfacing with input devices and output devices including keyboards, mouses, audio devices, displays, and the like.

In the example embodiment, storage device 326 is a hard disk, but in other embodiments, storage device 326 can be a flash memory, solid state disk drive (SSD), or any other suitable type of persistent storage device. RAM 322 interfaces with computer bus 312 so as to provide information stored in RAM 322 to CPU 310 during execution of the machine-executable instructions in software programs such as an operating system, application programs, and device drivers 332. More specifically, CPU 310 first loads computer-executable process steps (encoded in machine-executable non-transitory instructions) from storage device 326, or another storage device into a region of RAM 322. CPU 310 can then execute the stored process steps from RAM 322 in order to execute the loaded computer-executable process steps. Data such as audio data or other information can be stored in RAM 322, so that the data can be accessed by CPU 310 during the execution of computer-executable software programs (encoded in machine-executable instructions), to the extent that such software programs have a need to access and/or modify the data.

As also shown in FIG. 3, storage device 326 contains operating system 328, and application programs 330 (encoded in machine-executable non-transitory instructions), such as media manager application 334. Storage device 326 also contains device drivers 332 for software interface to devices, such as input device drivers, output device drivers, and other device drivers. Storage device 326 also contains media manager application 334. The media manager application 334 comprises computer-executable process steps (encoded in machine-executable instructions) that receive media streams and selectively direct the media streams to appropriate communication devices.

Figure 4:
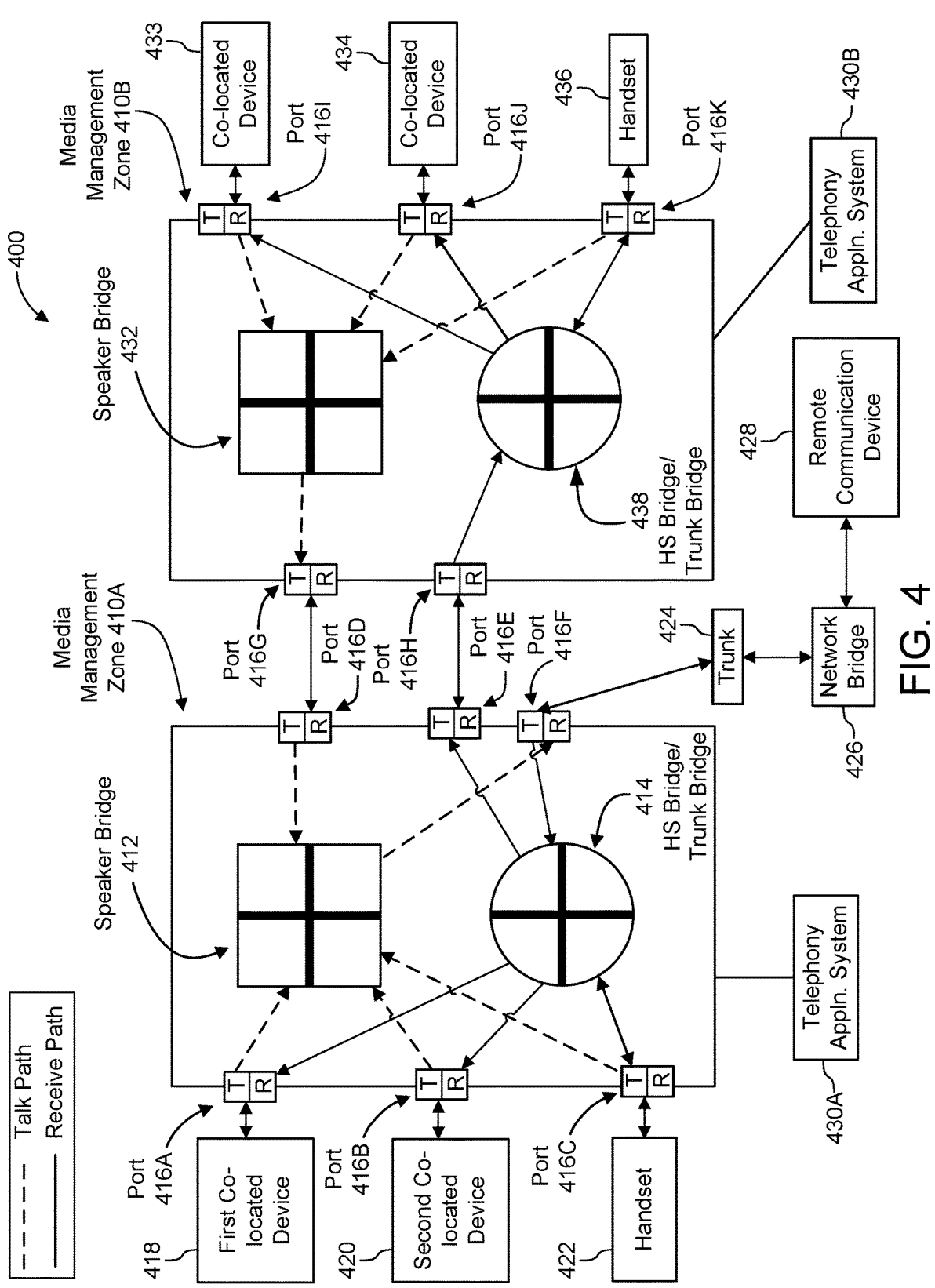
FIG. 4 is a block diagram of example media management zones for routing audio in the semi-global mute system.

FIG. 4 is a block diagram of example media management zones for routing audio in the semi-global mute system. In the shown embodiment, semi-global mute management system 400 includes media management zone 410A and media management zone 410B. Each media management zone includes co-located devices, handsets, respective ports, a speaker bridge, and a trunk bridge.

In the shown embodiment, media management zone 410A includes a speaker bridge 412 for connecting talk paths to a trunk 424 through port 416F, and the media management zone 410A also includes the trunk bridge 414 (also referred to as a Handset (HS) bridge/trunk bridge) that connects receive paths from port 416F to speakers. As a result, transmitted audio from devices within media management zone 410 proceed through speaker bridge 412 to the port 416F and received audio from port 416F proceeds through a trunk bridge 414 to the output devices of each device connected to media management zone 410A. These bridges are configured to communicate audio between remote communication device 428 to first co-located communication device 418, the second co-located communication device 420, and the handset 422. First co-located communication device 418 connects through the transmission port (T) of port 416A to the speaker bridge 412. Similarly, the second co-located communication device 420 and the handset 422 connect through the port 416B and the port 416C, respectively. Further the port 416D and the port 416E connect media management zone 410A to media management zone 410B. The additional port 416F connects all co-located devices, speakers, and handsets to one or more remote communication devices such as remote communication device 428. To connect to remote devices, media management zone 410A connects port 416F to trunk 424. Trunk 424 then connects through network bridge 426 to remote communication device 428. The trunk is a communications link that carries multiple signals simultaneously to provide network connection between two points.

In the shown embodiment, if first co-located communication device 418 transmits audio, the audio proceeds through the transmit (T) port of port 416A to speaker bridge 412. Then, the audio is forwards to the receive port (R) of port 416F and transmitted to trunk 424, through network bridge 426, and finally to remote communication device 428. Since the speaker bridge 412 is not connected to trunk bridge 414, transmitted audio from first co-located communication device 418 is not played on speakers of second co-located communication device 420 or handset 422. When the remote communication device 428 transmits audio, the audio data proceeds through network bridge 426, to trunk 424 and is received by the R port of port 416F. Port 416F feeds the audio data to the trunk bridge 414. The trunk bridge 414 feeds the signal to each of the R ports of port 416A, port 416B, port 416C so each respective device can output the received audio.

In the shown embodiment, media management zone 410A receives audio transmissions through port 416D from media management zone 410B and its port 416G. Speaker bridge 432 connects talk paths from co-located device 433, co-located device 434, and handset 436. Thus, transmitted audio from these devices proceeds through speaker bridge 432. Port 416I, port 416J, and port 416K connect their respective devices to the speaker bridge 432 through the T port as shown. After receiving the audio data, speaker bridge 432 forwards the audio data to the T port of Port 416G, which sends the audio to the R port of 416D. The speaker bridge 412 receives the audio data from 416D and transmits the data to port 416F for transmission to the trunk. Any received audio from the trunk 424 reaches media management zone 410B and its co-located devices by first going to trunk bridge 414. Trunk bridge 414 then transmits its audio to port 416E which then goes to port 416H and then to trunk bridge 438. Trunk bridge 438 distributes the audio to the R port of ports 416I, 416J, and 416K that feed the audio to an audio output device of co-located device 433, co-located device 434, and handset 436. In addition, both media management zones connect to telephony application system 430A and telephony application system 430B, respectively (collectively referred to as telephony application system 430).

In the shown embodiment, the separation of speaker bridge 412 and trunk bridge 414 facilitates the semi-global mute function. In this embodiment, the devices included with media management zone 410A and media management zone 410B are all co-located. Further, all the devices are in acoustic proximity in this embodiment. If the co-located devices all playback audio from the first co-located communication device 418, then there will be an out of phase playback similar to sidetone, first from the actual audio that is received at the first co-located device and then again through the other co-located devices. In the shown embodiment, the speaker bridge, which receives audio input from the co-located devices in both media management zones 410A and 410B, connects all talk paths without transmitting audio to the trunk bridge 414 since there is no connection between the bridges, thus, preventing the effect. Instead, the speaker bridge unilaterally transmits audio to the port 416F for transmission to the trunk 424 and the remote communication device 428. The trunk bridge 414 connects all receive paths from the trunk 424 back to each device.

In some embodiments, the trunk is a communications link that carries multiple signals simultaneously to provide network connection between two points. In some embodiments, the network bridge includes routers, switches, and other networking components to connect the media management zones 410A and 410B to external networks. In some embodiments, the network bridge 426 connects the trunk to any external networks or devices. For example, the network bridge connects to additional remote communication devices in addition to the remote communication device 428. Other embodiments may include additional network connection components as well.

Here, semi-global mute management system 400 includes speaker bridges 412 and 432 in addition to trunk bridges 414 and 438 that connect through one or more talk paths and one or more receive paths. Talk paths provide a communication path for transmitting audio from the indicated device or bridge as described, previously. The talk paths illustrate audio transmission path from devices within the media management zones to external devices during a semi-global mute session. In some embodiments, the talk paths are unidirectional and only allow audio to flow from the origin device to the shown destination and not the reverse direction. For example, once first co-located communication device 418 transmits audio along the shown talk path, speaker bridge 412 receives the transmitted audio, but cannot transmit audio in return through that specific talk path. In some embodiments, the speaker bridge 412 can only transmit audio to port 416F through the corresponding talk path that connects the two components. Analogously, receive paths are also unidirectional communication paths. These paths indicate the transmission path of received audio from devices external to the media management zone during a semi-global mute session. For example, received audio from a remote communication device passes through port 416F and is transmitted to trunk bridge 414 through the shown receive path. The trunk bridge 414 then feeds the audio to all co-located devices such as first co-located communication device 418 through a corresponding receive path.

In some embodiments, some devices, such as handset 422, include bidirectional audio transmission paths as shown. The bidirectional transmission paths allow audio to be transmitted in both directions. In some embodiments, devices with audio output devices that are designed to be heard privately (handsets, headsets, etc.) include a bidirectional audio path to the respective trunk bridge. For example, audio may flow from handset 422 to trunk bridge 414 and flow in the reverse direction as well. However, devices with bidirectional communications also connect with a unidirectional talk path to the speaker bridge 412 for transmission to a remote communication device during a semi-global mute session, without the co-located devices that use speakers replaying input audio of the handset 422 in some embodiments. Further, the bidirectional connection for handsets enables a global mute that prevents others from hearing the remote communication device as well since handsets may still need a global mute function in some embodiments. For example, a global mute handset may join a speaker call and mute all other communication devices on the call. The global muting is configured to allow a communication device, such as handset 422, to have a private call with the remote communication device 428.

In the shown embodiment, the telephony application system 430A and 430B are shown as separate components, however, in some embodiments both may be the same system or connected to the same system to control the media management zones 410A and 410B. In some embodiments, telephony application system 430 additionally controls the initiation of the shown bridges and signaling of the devices using SIP to enable connections that include the talk paths and receive paths as described in association with FIG. 5. Further, semi-global mute management system 400 shows two media management zones, however, other embodiments may include additional media management zones.

Figure 5:
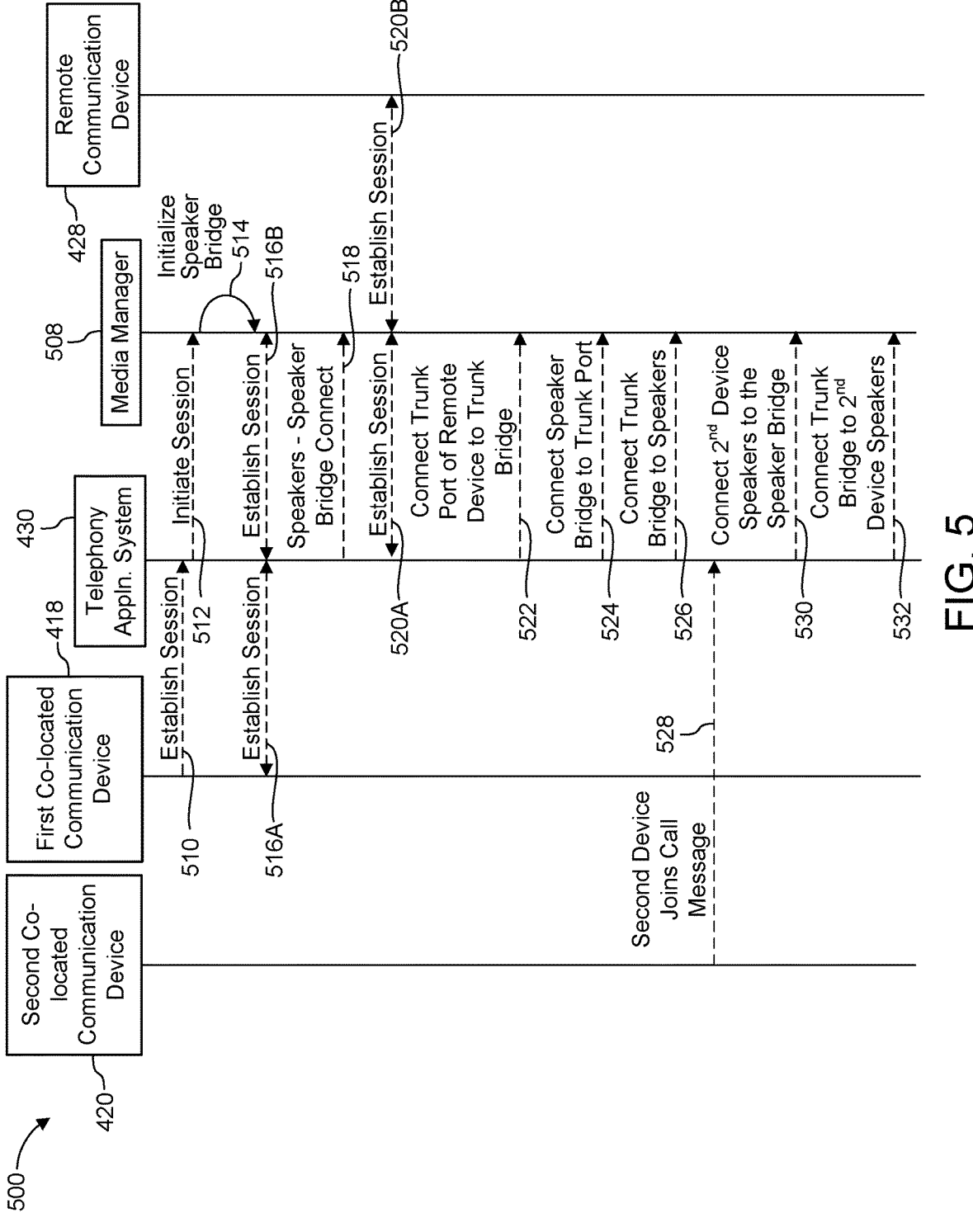
FIG. 5 illustrates an example process flow diagram for initializing audio bridges of FIG. 4 through signaling.

FIG. 5 illustrates an example process flow diagram for initializing audio bridges of FIG. 4 through signaling. Here, initiation process 500 begins with establish session 510 where the first co-located communication device 418 sends the establish session 510 message to telephony application system 430. The telephony application system initiates the session by sending initiate session 512 message to the media manager 508. Next, the media manager 508 initializes the speaker bridge 514, which includes creating the speaker bridge to receive talk paths from co-located devices. Once initialized, the media manager 508 establishes session 516A between the telephony application system 430. Establish session 516B also connects the session between the media manager 508 and the telephony application system 430. Once established, the telephony application system 430 sends speakers to speaker bridge connect 518. In some embodiments, input devices of the first co-located communication device 418 have a talk path connected to the speaker bridge as shown in semi-global mute management system 400.

Proceeding through the initiation process 500, the telephony application system 430 then establishes the session 520A between the media manager 508 and the remote communication device 428 in establish session 520B. The telephony application system 430 then instructs the media manager to connect the trunk port, such as port 416F, to the trunk bridge in message 522. Here, the trunk bridge is also used for non-semi-global mute communications, thus, it is already initialized. In some embodiments, the initiation process 500 includes initiating the trunk bridge by the media manager as well. Next, the telephony application system 430 instructs the media manager to connect the speaker bridge to the trunk port through a talk path for audio transmission to the remote communication device 428 in message 524. In addition, the telephony application system 430 instructs the media manger 508 to connect the trunk bridge to speakers or output devices of the first co-located communication device in message 526.

Once a second co-located device joins, the second co-located device informs the telephony application system in message 528 that it is joining the semi-global mute session. The telephony application system 430 instructs the media manager to connect the second co-located communication device 420's audio input to the speaker bridge in message 530 and the speaker output devices of the second co-located communication device 420 to the trunk bridge for audio reception. The telephony application system 430 instructs the media manager 508 to connect the trunk bridge to the second co-located communication device 420's speakers in message 532.

In the shown embodiment, the shown messages utilize the SIP protocol for sending and receiving transmissions. Other embodiments may include using a different protocol to initiate communication functions between the shown devices. The shown embodiment also includes the media manager 508 for controlling the media management zones 410A and 410B. In some embodiments, the media manager 508 includes and/or controls the media management zones 410A and 410B and the respective speaker bridges and trunk bridges. Media manager may be executed via software components, hardware components, or virtual components to initialize the shown bridges and corresponding talk paths and receive paths. In some embodiments, additional devices connect to the semi-global mute session using the same or similar messages.

Figure 6:
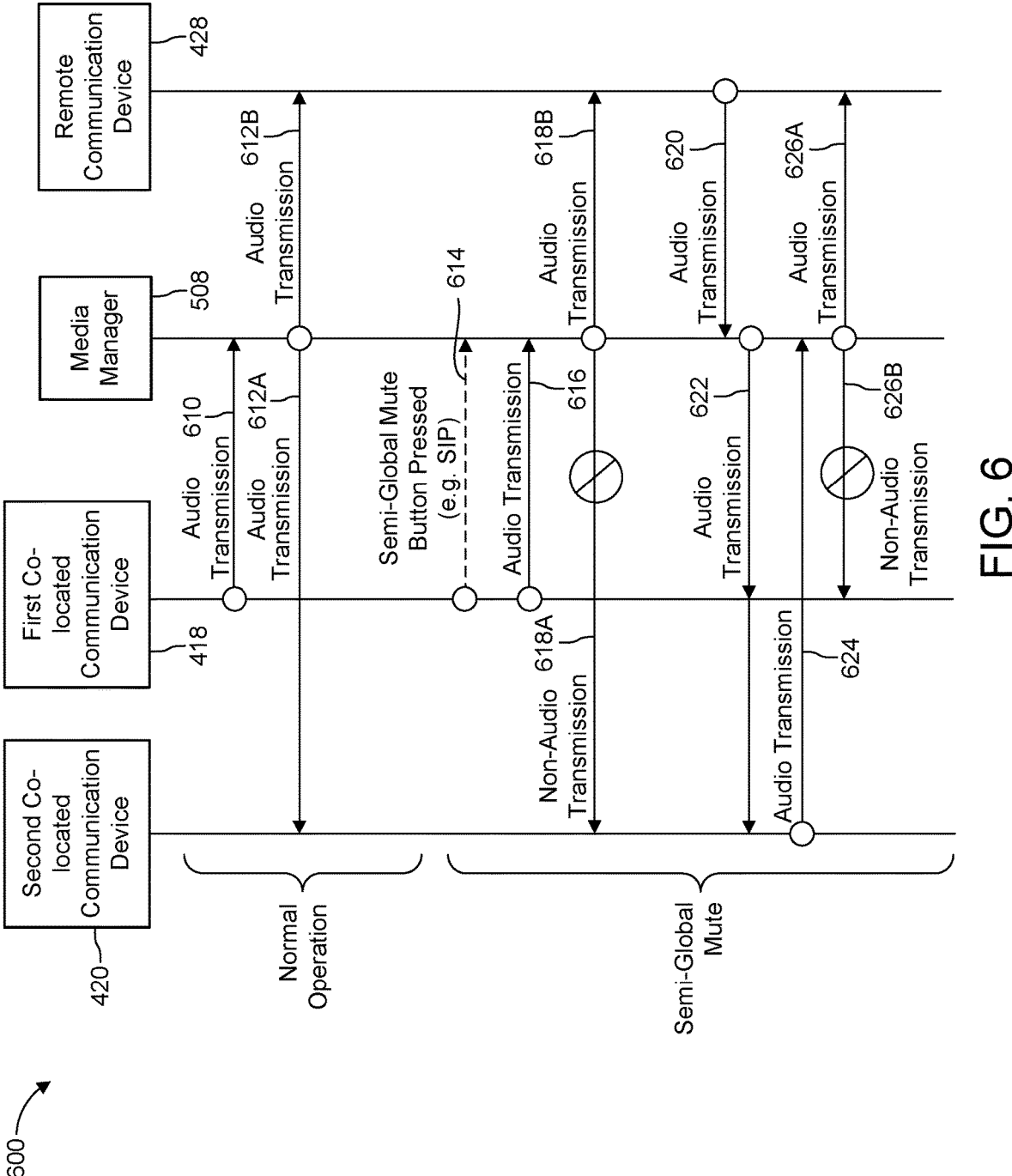
FIG. 6 illustrates an example process flow diagram for receiving audio by a media manager of FIG. 4 and selectively transmitting the audio to the specified devices of FIG. 1.

FIG. 6 illustrates an example process flow diagram for receiving audio by a media manager of FIG. 4 and selectively transmitting the audio to the specified devices of FIG. 1. Audio transmission process 600 illustrates normal operation without the semi-global mute function or a global mute function. Audio transmission process begins with normal operation, which includes an audio transmission message 610 from the first co-located communication device 418 over RTP. Audio transmission message 610 is sent when the first co-located communication device 418 detects audio is to be transmitted due to a push-to-talk switch being activated and/or a microphone receiving audio input. The audio transmission message 610 includes received audio data for playback at a separate device. Once media manager 508 receives audio transmission message 610, media manager 508 sends audio transmission message 612A to a second co-located communication device 420 and audio transmission message 612B to a remote communication device 428. Each respective device then outputs the audio received at the first co-located communication device 418.

In the shown embodiment, the first co-located communication device sends message 614 indicating that the semi-global mute button has been pressed during the semi-global mute operation. In some embodiments, message 614 is sent over SIP as opposed to RTP. After engaging the semi-global mute function, the first co-located communication device transmits audio in audio transmission message 616 to the media manager 508 similarly to normal operation. In contrast to normal operation, the media manager only transmits the received audio in audio transmission message 618B to the remote communication device 428 and does not send the audio as shown by the non-transmission indicator 618A that indicates the audio was not transmitted to the second co-located communication device 420. Once the remote communication device 428 replies with transmitted audio of its own included within audio transmission message 620, the media manager 508 feeds the received audio to both the first co-located communication device 418 and the second co-located communication device 420 in audio transmission message 622. If push-to-talk switch is enabled by the second co-located communication device 420, then the device sends audio transmission message 624 to the media manager 508. Then, media manager sends audio transmission message 626A to remote communication device 428, however, it does not send an audio message to the first co-located communication device 418 as shown by non-audio transmission in non-transmission indicator 626B.

As shown in the indicated embodiment, the semi-global mute function and respective transmission messages are shown over RTP. Other embodiments may utilize a different protocol to transmit media. In some embodiments, each audio transmission message is transmitted over a respective talk path or receive path shown in semi-global mute management system 400. In some embodiments, audio transmission message 616 is sent over a talk path to the speaker bridge 412 that is within and/or controlled by media manger 508. Once received, the media manager 508 transmits the audio transmission message 618B from port 416F to trunk 424, then network bridge 426, and remote communication device 428. In some embodiments, the audio transmission message 620 is received by the trunk bridge 414 over a received path connecting the trunk bridge 414 to port 416F. Then the audio is fed in audio transmission message 622 to the first co-located communication device 418 and second co-located communication device 420 over the receive paths connected to the trunk bridge 414 to the respective devices. In some embodiments, other connected devices also receive the audio transmission message 622 over their respective receive paths. In some embodiments, the co-located devices do not receive the transmitted audio from other co-located devices as shown in non-transmission indicator 618A and 626B since the talk paths and receive paths do not connect.

FIG. 7 illustrates an example semi-global mute process 700 for enabling the semi-global mute feature shown in FIG. 1. In the shown diagram, semi-global mute process 700 includes operations 710-716 to mute co-located communication devices. Semi-global mute process 700 may utilize components, devices, and systems discussed previously. For example, one embodiment may include the media manager 508 performing some or all the indicated operations.

A message receiving operation 710 performs receiving, from a first audio communication device having a semi-global mute switch, a message indicating the semi-global mute switch has been activated, the first audio communication device being in communication with a co-located communication device and a remote communication device. In some embodiments, the first audio communication device is the first co-located communication device 418 or the communication device 112A, the co-located communication device is the second co-located communication device 420 or communication device 112B, and the remote communication device is the remote communication device 428. In some embodiments, the audio communication device and the co-located communication device may be in a media management zone. In additional embodiments, the message is message 614 and sent over SIP. In some embodiments, the message further indicates that the first audio communication device and/or the co-located communication device output received audio through speakers. In turn, a muting operation 712 performs preventing the co-located communication device from receiving the audio signals transmitted from the first audio communication device. In some embodiments, the prevention may be similar or the same as non-transmission indicator 618A or non-transmission indicator 626B. In some embodiments, preventing the reception of audio signals may be accomplished by connecting talk paths through speaker bridge 412 and receive paths through trunk bridge 414.

A permitting operation 714 performs permitting the first audio communication device to transmit signals to the remote communication device. In some embodiments, the permission may result in audio transmission messages going to the remote communication device as shown in audio transmission message 618B. In some embodiments, permitting operation 714 may further include transmitting audio through a talk path to the remote communication device. In some embodiments, this operation may further include feeding/transmitting the audio transmission messages from the audio communication device through a network bridge and/or a trunk. In turn, a second permitting operation 716 performs permitting the first audio communication device and the co-located communication device to receive audio signals transmitted from the remote communication device. In some embodiments, this operation may include transmitting the received audio through receive paths connected to an trunk bridge and the audio communication device's speakers and the co-located device's speakers.

In some embodiments, the co-located communication device and the audio communication device are in acoustic proximity. In some embodiments, the audio signals are received through a first talk path corresponding to the first audio communication device, and the audio signals are provided to the at remote communication device through a first receive path corresponding to the co-located communication device. In some embodiments the first receive path connects to the first talk path through the network bridge.

It should be understood that the FIGS. 1-7 are presented for example purposes only. The architecture of the example embodiments presented herein is sufficiently flexible and configurable, such that it may be utilized (and navigated) in ways other than that shown in the accompanying figures.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for muting communication devices, comprising:

receiving, from a first audio communication device having a semi-global mute switch, a message indicating the semi-global mute switch has been activated, the first audio communication device being in communication with a co-located communication device and a remote communication device, wherein a receive port of the co-located communication device for receiving audio signals and a receive port of the first audio communication device for receiving the audio signals are (i) disconnected from a speaker bridge and (ii) connected to a trunk bridge; and upon receiving the message:

receiving, by the speaker bridge, the audio signals from the first audio communication device;

forwarding, through the speaker bridge, the audio signals to the remote communication device, receiving, by the trunk bridge, second audio signals from the remote communication device, and forwarding, through the trunk bridge, the second audio signals to the receive port of the first audio communication device and the receive port of the co-located communication device;

wherein the audio signals are received through a first talk path corresponding to the first audio communication device, the audio signals are forwarded to the remote communication device through a network bridge, and the second audio signals are received through a first receive path connected to the network bridge.

2. The method of claim 1, wherein the co-located communication device and the first audio communication device are in acoustic proximity.

3. The method of claim 1, wherein the first audio communication device and the co-located communication device are in a media management zone.

4. The method of claim 3, wherein the remote communication device is external to the media management zone, and the remote communication device is in communication with the media management zone using the network bridge.

5. The method of claim 1, wherein the message indicating the semi-global mute switch has been activated further indicates the co-located communication device outputs received audio through one or more speakers.

6. A system for selectively muting communication devices, the system comprising:

a first audio communication device including a semi-global mute switch and a receive port;

a co-located communication device including a receive port, wherein the co-located communication device is located within the same audible area as the first audio communication device;

a remote communication device;

one or more media managers including:

a speaker bridge disconnected from the receive port of the co-located communication device and the first receive port of the first audio communication device;

a trunk bridge connected to the receive port of the co-located communication device and the first receive port of the first audio communication device;

one or more processors; and one or more memory devices coupled to the one or more processors and storing data instructions that, when executed by the one or more processors, cause the one or more processors to:

receive, from the first audio communication device, a message indicating the semi-global mute switch has been activated, the first audio communication device being in communication with the co-located communication device and the remote communication device;

upon reception of the message:

receive, by the speaker bridge of the one or more media managers, audio signals from the first audio communication device;

forward, through the speaker bridge, the audio signals to the remote communication device, receive, by the trunk bridge, second audio signals from the remote communication device, and forward, through the trunk bridge, the second audio signals from the remote communication device to the receive port of the first audio communication device and the receive port of the co-located communication device;

wherein the audio signals are received through a first talk path corresponding to the first audio communication device, the audio signals are forwarded to the remote communication device through a network bridge, and the second audio signals are received through a first receive path connected to the network bridge.

7. The system of claim 6, wherein the co-located communication device and the first audio communication device are in acoustic proximity.

8. The system of claim 6, wherein the first audio communication device and the co-located communication device are in a media management zone.

9. The system of claim 8, wherein the remote communication device is external to the media management zone, and the remote communication device is in communication with the media management zone using the network bridge.

10. The system of claim 6, wherein the message indicating the semi-global mute switch has been activated further indicates the co-located communication device outputs received audio through one or more speakers.

11. A non-transitory computer-readable medium having stored thereon one or more sequences of instructions for causing one or more processors to perform:

receiving, from a first audio communication device having a semi-global mute switch, a message indicating the semi-global mute switch has been activated, the first audio communication device being in communication with a co-located communication device and a remote communication device, wherein a receive port of the co-located communication device for receiving audio signals and a receive port of the first audio communication device for receiving the audio signals are (i) disconnected from a speaker bridge and (ii) connected to a trunk bridge; and upon receiving the message:

receiving, by the speaker bridge, the audio signals from the first audio communication device;

forwarding, through the speaker bridge, the audio signals to the remote communication device, receiving, by the trunk bridge, second audio signals from the remote communication device, and forwarding, through the trunk bridge, the second audio signals to the receive port of the first audio communication device and the receive port of the co-located communication device;

wherein the audio signals are received through a first talk path corresponding to the first audio communication device, the audio signals are forwarded to the remote communication device through a network bridge, and the second audio signals are received through a first receive path connected to the network bridge.

12. The non-transitory computer-readable medium of claim 11, wherein the co-located communication device and the first audio communication device are in acoustic proximity.

13. The non-transitory computer-readable medium of claim 11, wherein the first audio communication device and the co-located communication device are in a media management zone.

14. The non-transitory computer-readable medium of claim 13, wherein the remote communication device is external to the media management zone, and the remote communication device is in communication with the media management zone using the network bridge.

* * * * *